(12) United States Patent
Alameh et al.

(10) Patent No.: US 8,102,588 B2
(45) Date of Patent: Jan. 24, 2012

(54) MAGNETO-OPTO PHOTONIC CRYSTAL MULTIPLAYER STRUCTURE HAVING ENHANCED FARADAY ROTATION WITH VISIBLE LIGHT

(75) Inventors: Kamal Alameh, Quinns Rocks (AU); Alex Grishin, Skärholmen (SE)

(73) Assignee: Panorama Synergy Ltd., Balcatta, WA (AU)

( * ) Notice: Subject to any disclaimer, the term of this patent is extended or adjusted under 35 U.S.C. 154(b) by 399 days.

(21) Appl. No.: 12/293,142

(22) PCT Filed: Mar. 17, 2007

(86) PCT No.: PCT/IB2007/050930
§ 371 (c)(1),
(2), (4) Date: Feb. 5, 2009

(87) PCT Pub. No.: WO2007/107941
PCT Pub. Date: Sep. 27, 2007

(65) Prior Publication Data
US 2009/0219602 A1    Sep. 3, 2009

Related U.S. Application Data

(60) Provisional application No. 60/767,315, filed on Mar. 17, 2006.

(51) Int. Cl.
*G02F 1/09* (2006.01)
(52) U.S. Cl. ........................................ 359/280
(58) Field of Classification Search .................. 359/280, 359/281, 282, 283, 284, 483, 484
See application file for complete search history.

(56) References Cited

U.S. PATENT DOCUMENTS

| 5,058,971 A * | 10/1991 | Schmitt et al. ................. 385/11 |
| 6,545,795 B2 * | 4/2003 | Matsushita et al. ............ 359/280 |
| 6,701,048 B2 | 3/2004 | Figotin et al. |
| 2002/0154403 A1 * | 10/2002 | Trotter, Jr. .................... 359/484 |

FOREIGN PATENT DOCUMENTS

| JP | 11065480 A | 3/1999 |
| JP | 2000267057 A | 9/2000 |

OTHER PUBLICATIONS

PCT International Search Report and Written Opinion.
Kahl, S. and Grishin, A.M., "Enhanced Faraday rotation in all-garnet magneto-optical photonic crystal", Applied Physics Letters, 2004, vol. 84, No. 9, pp. 1438-1440.

(Continued)

*Primary Examiner* — William Choi
*Assistant Examiner* — Tuyen Q Tra
(74) *Attorney, Agent, or Firm* — Howard & Howard Attorneys PLLC

(57) ABSTRACT

An apparatus, method, system, and computer-program product for producing magneto-optic materials in the blue and green wavelengths. The apparatus includes a substrate generally transparent to a light signal including a component at a predetermined visible frequency; a stack of optical multilayers overlying the substrate for transmitting the component with at least about forty percent power therethrough and having at least about twenty-four degrees of Faraday rotation per micron for the predetermined visible frequency less than about six hundred nanometers. The method includes processes for the manufacture and assembly of the disclosed materials, with the computer program product including machine-executable instructions for carrying out the disclosed methods.

21 Claims, 6 Drawing Sheets

OTHER PUBLICATIONS

Sakaguchi, S. and Sugimoto, N., "Transmission characteristics of periodic magneto-optical and dielectric multilayer films under a variable magnetic field", Journal of the Optical Society of America A, 1999, vol. 16, No. 8, pp. 2045-2049.

European Office Action and Supplementary European Search Report.

Khartsev, S. et al., "[Bi3Fe5O12/Gd3Ga5O12]m magneto optical photonic crystals", Applied Physics Letters, AIP, American Institute of Physics, Melville, NY, US, vol. 87, No. 12, Sep. 16, 2005, pp. 122504-122504, XP012075738 ISSN: 0003-6951.

Zhdanov, A.G. et al., "Enhancement of Faraday rotation at photonic-band-gap edge in garnet-based magnetophotonic crystals", Journal of Magnetism and Magnetic Materials, Elsevier Netherlands, vol. 300, No. 1, Nov. 16, 2005, pp. e253-e256, XP002547284 ISSN: 0304-8853.

Hamon, T. et al., "Investigation of a one-dimensional magnetophotonic crystal for the study of ultrathin magnetic layer", Journal of Physics D. Applied Physics, IOP Publishing, Bristol, GB, vol. 39, No. 6, Mar. 3, 2006, pp. 1012-1017, XP020095093 ISSN: 0022-3727.

Atkinson, R., "Limits of enhancement of the Faraday effect in ultra-thin magnetic layers by one-dimensional magnetophotonic crystals", Journal of Physics D. Applied Physics, IOP Publishing, Bristol, GB, vol. 39, No. 6, Mar. 3, 2006, pp. 999-1005, XP020095091 ISSN: 0022-3727.

Park, Jae-Hyuk et al., "Numerial Analysis of One-Dimensional Magnetophotonic Crystals with an Active Layer of a Highly Bi-Substituted Iron Garnet", Japanese Journal of Applied Physics, Part 1 (Regular Papers, Short Notes & Review Papers) Japan Soc. Appl. Phys Japan, vol. 42, No. 7A, Jul. 2003, pp. 4383-4386, XP002547285 ISSN: 0021-4922.

Kato, H. et al., "Coexistence of large Faraday rotation and high transmittance in magnetophotonic crystals with multi-cavity structures", Journal of Magnetism and Magnetic Materials, Elsevier Science Publishers, Amsterdam, NL, vol. 272-276, May 1, 2004, pp. E1327-E1329, XP004513884 ISSN: 0304-8853.

Dolgova, T.V. et al., "Nonlinear magneto-optical Kerr effect in garnet magnetophotonic crystals", Journal of Applied Physics, American Institute of Physics, NY, US, vol. 95, No. 11, Jun. 1, 2004, pp. 7330-7332, XP012067028 ISSN: 0021-8979.

Gourdon, C. et al, "Novel Magneto-Optic Layers Based on Semiconductor Nanostructures for Kerr Microscopy", Magneto-Optical Materials for Photonics and Recording, Symposium Nov. 29-Dec. 2, 2004, Boston, MA USA, 2005, pp. 241-246, XP002547286 Magneto-Optical Materials for Photonics and Recording, Symposium (Materials Research Society vol. 834) Materials Research Soc Warrendale, PA, USA ISBN: 1-55899-782-2.

Gourdon, C. et al., "Enhanced Faraday rotation in CdMnTe quantum wells embedded in an optical cavity", Solid State Communications Aug. 2002 Elsevier Ltd. GB, vol. 123, No. 6-7, Aug. 2002, pp. 299-304, XP002547287.

Chinese Office Action (Chinese and English Translation).

Innoue et al., "One-dimensional magnetophotonic crystals", Journal of Applied Physics, AIP, American Institute of Physics, vol. 85, No. 8, Apr. 15, 1999, pp. 5678-5770.

* cited by examiner

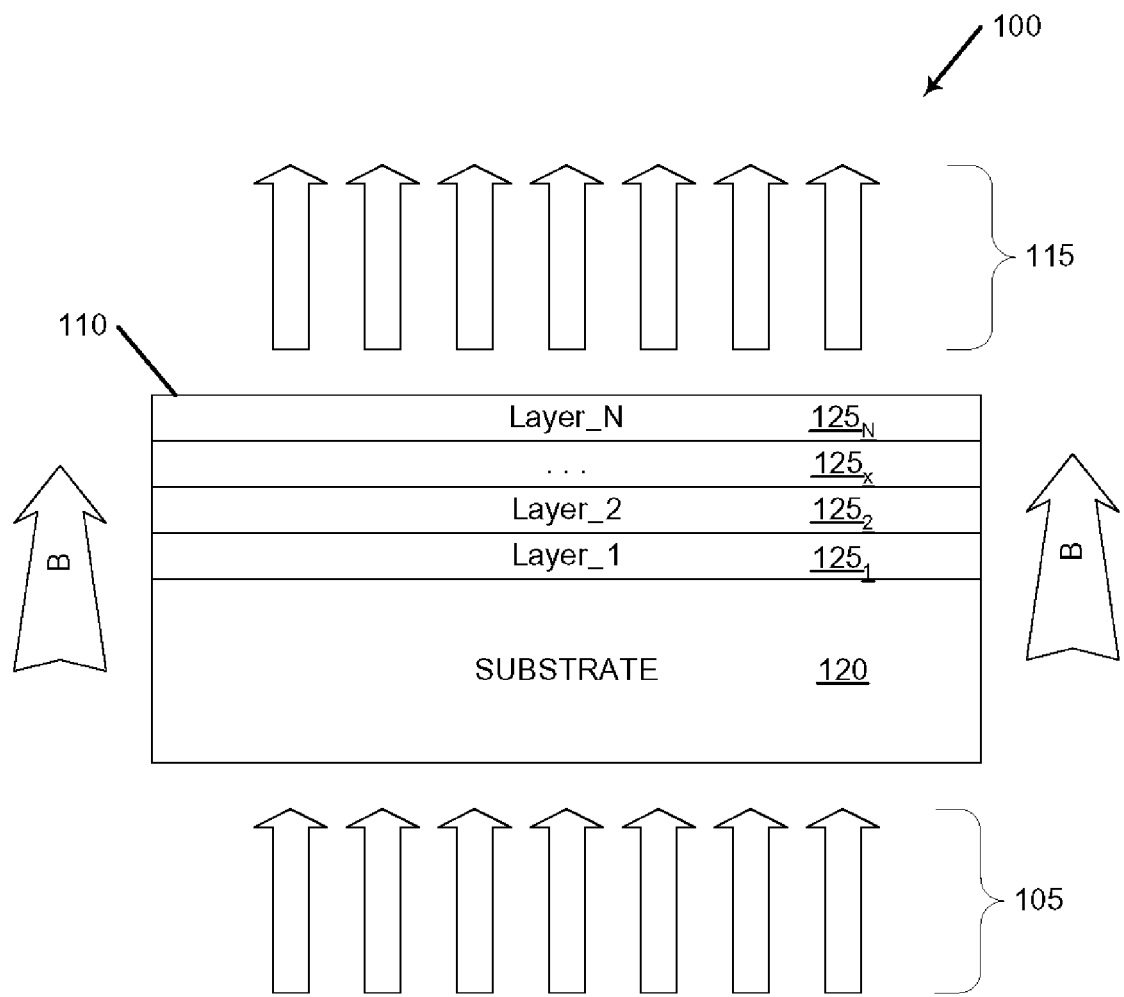
Figure_1

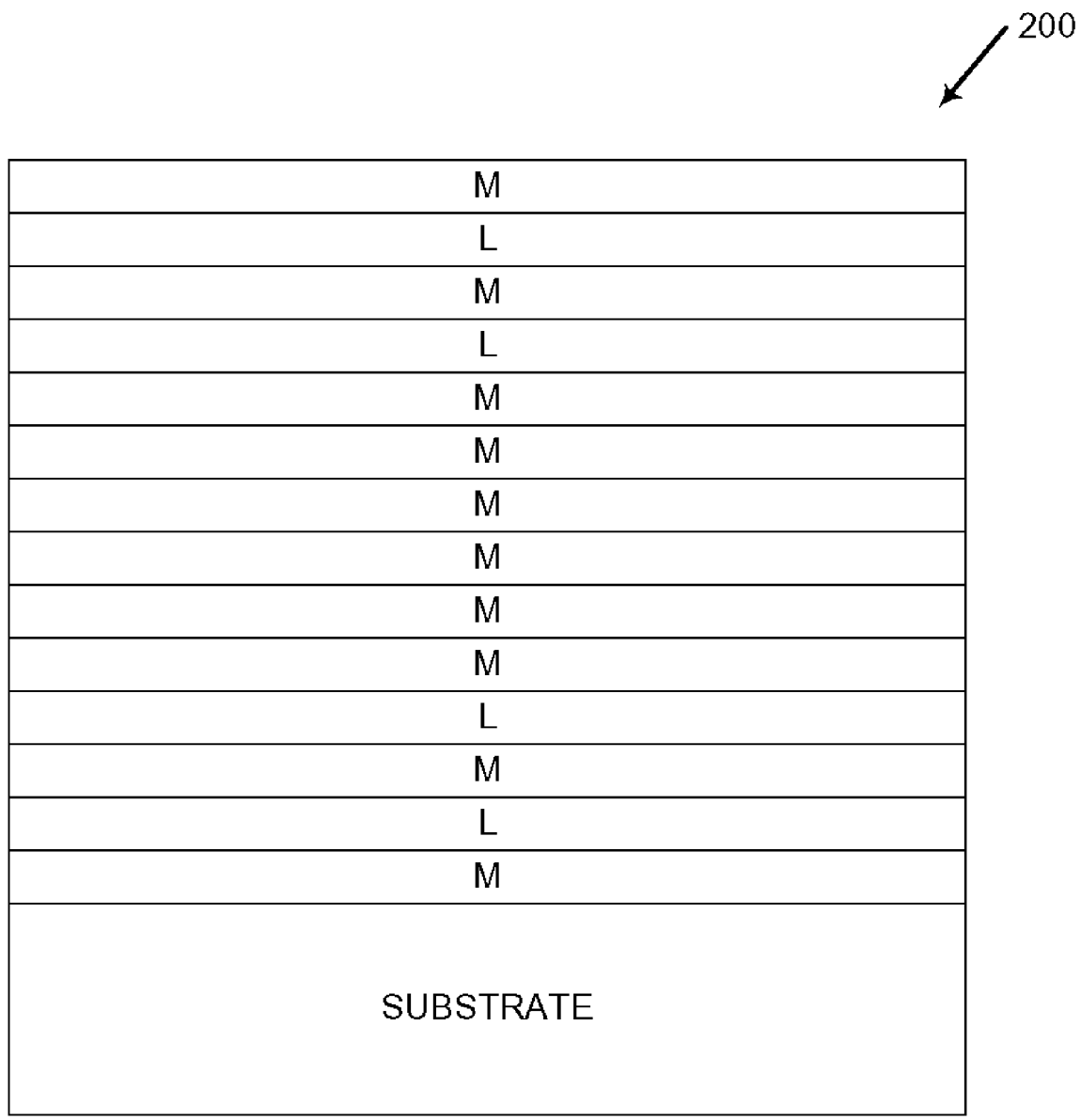
Figure_2

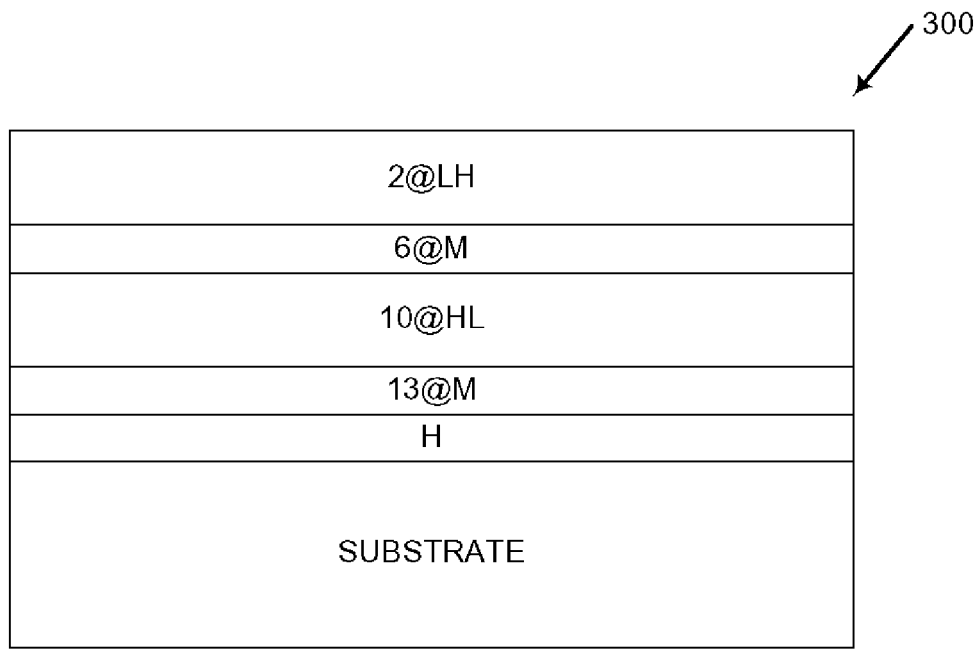
Figure_3
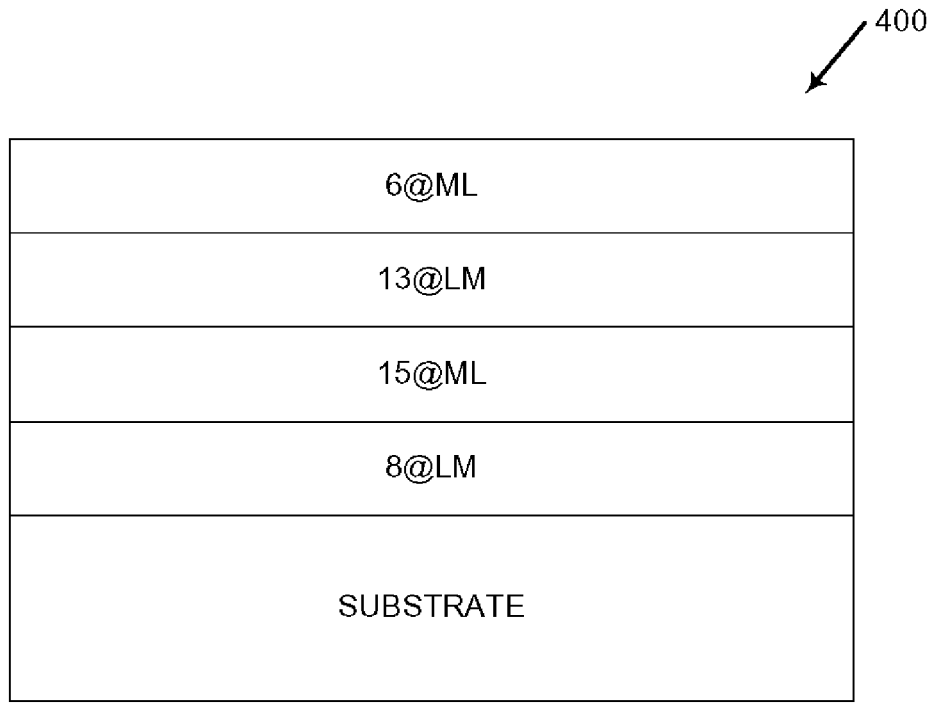
Figure_4

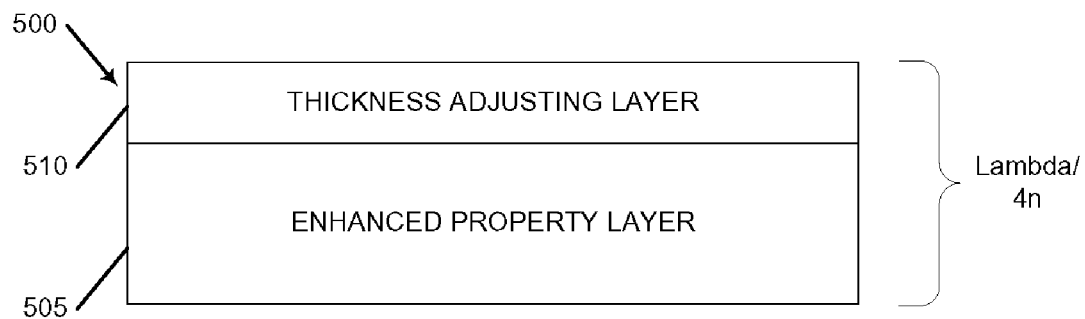
Figure_5
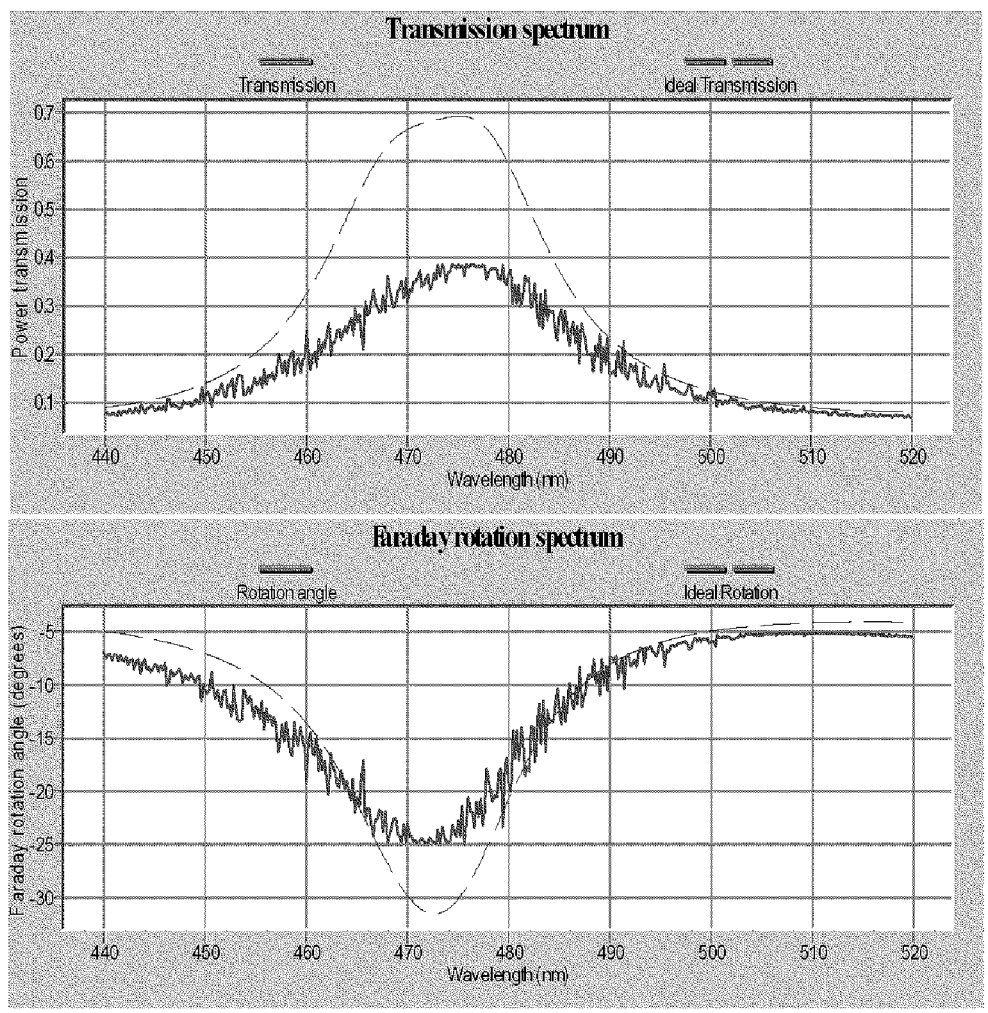
Figure_6

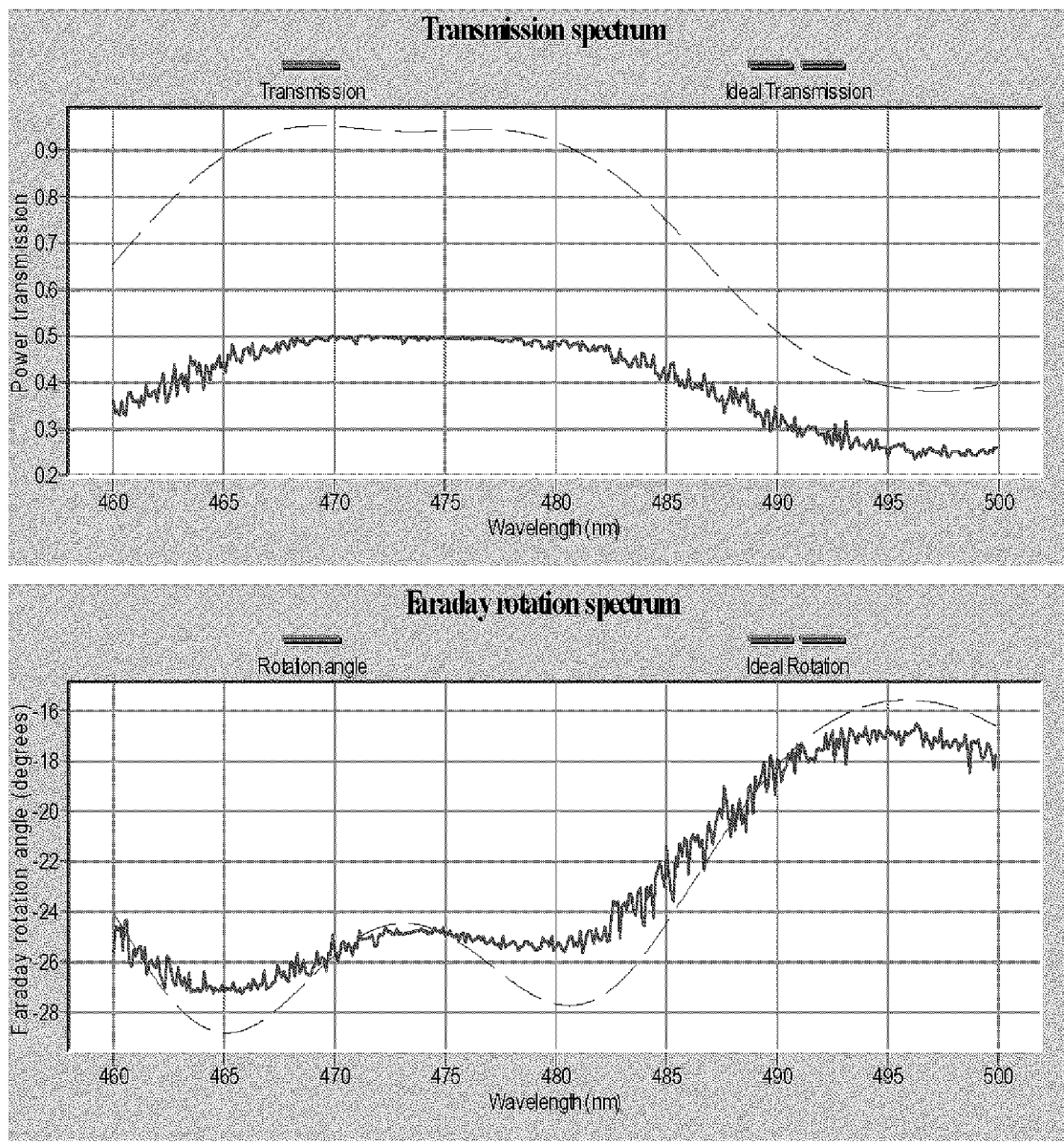
Figure_7

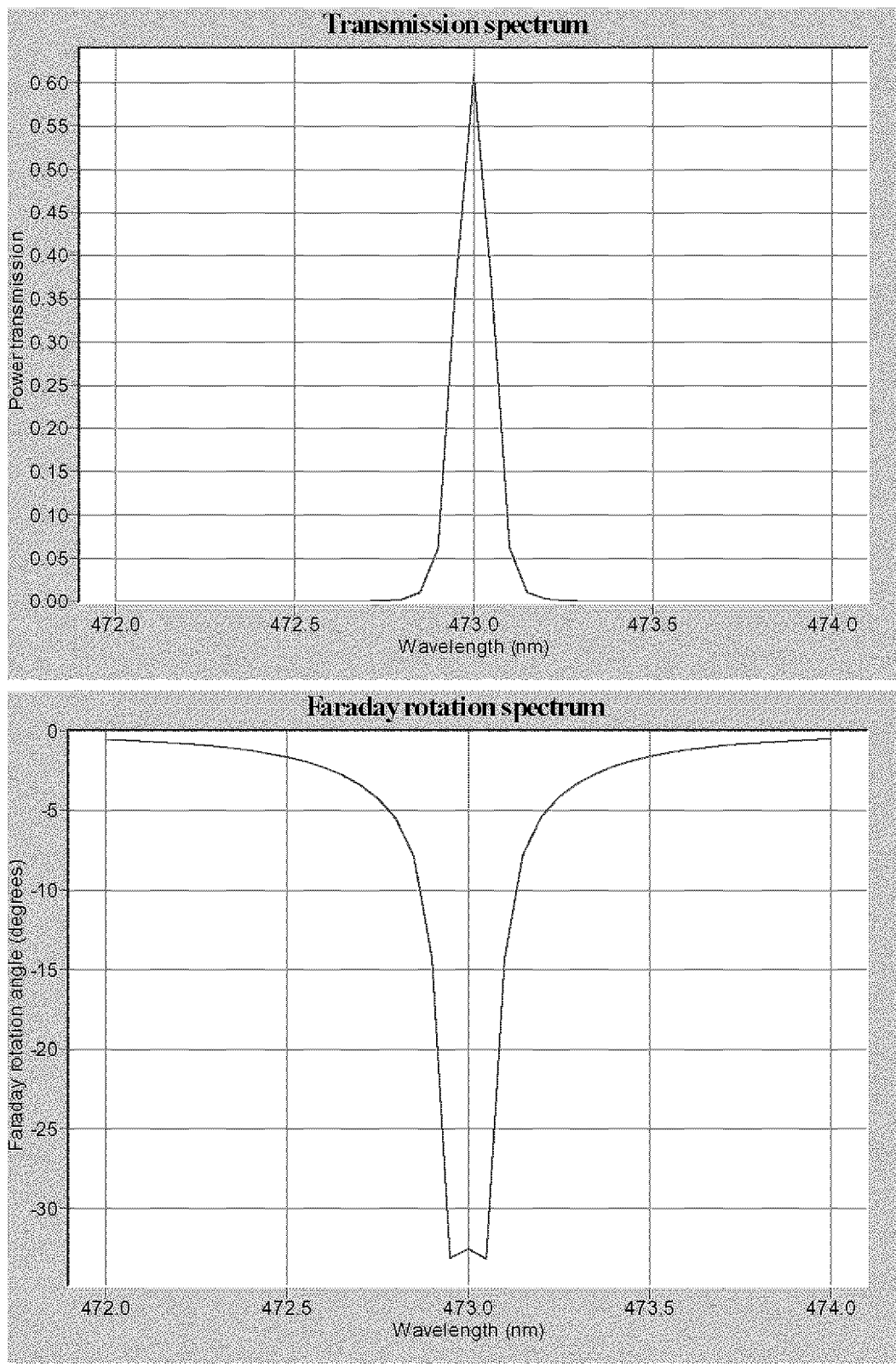
Figure_8

MAGNETO-OPTO PHOTONIC CRYSTAL MULTIPLAYER STRUCTURE HAVING ENHANCED FARADAY ROTATION WITH VISIBLE LIGHT

CROSS REFERENCE TO RELATED APPLICATIONS

This application claims priority to and all the advantages of International Patent Application No. PCT/IB2007/050930, filed on Mar. 17, 2007 which claims priority to U.S. Patent Application 60/767,315 filed 17 Mar. 2006 and entitled "MAGNETO-OPTO PHOTONIC CRYSTAL MULTI-PLAYER STRUCTURE HAVING ENHANCED FARADAY ROTATION WITH VISIBLE LIGHT" and is related to U.S. patent application Ser. No. 10/906,304 filed 14 Feb. 2005 and entitled "SYSTEM, METHOD, AND COMPUTER PROGRAM PRODUCT FOR MAGNETO-OPTIC DEVICE DISPLAY" and to U.S. Patent Application 60/766,764 filed 9 Feb. 2006 entitled "Nano-Engineered magneto-photonic planar thin-films for a low power, high density digital cinema projector and flat panel display systems" that are hereby expressly incorporated by reference in their entireties for all purposes.

BACKGROUND OF THE INVENTION

The present invention relates generally to multilayer optical materials and more particularly to multilayer magneto-optic photonic crystal materials tuned to produce an enhanced Faraday Rotation and transmission at particular wavelengths of visible radiation.

Faraday rotation, also called the Faraday Effect, is well-known in general, and its application to telecommunications systems using signals in the infrared spectrum is extensive. In brief, the Faraday Effect provides for changing a polarization angle of a radiation signal when a magnetic field is present in the direction of propagation. An amount of polarization angle change is a function of magnetic field strength, distance over which the magnetic field acts, and a Verdet constant of the material through which the radiation signal is propagating.

An advantage that telecommunications systems have is that they operate using infrared frequencies. At infrared frequencies, materials exist having good Verdet constants and good transmissivity constants. Material properties and structures affecting the Faraday Effect have been extensively explored for these applications.

Magneto-optic materials have been contemplated for use in magneto-optic displays. As well known, displays are generally of two types: monochromatic and multicolor. Obviously for a display, the radiation frequency(ies) are in the visible spectrum. It has been discovered that as the operating frequency of a magneto-optic display is decreased from the infrared spectrum into the visible spectrum, transmissivity of the radiation through materials having desirable effective Verdet constant values becomes unacceptable. Thus a multicolor display employing a red, green, and blue (RGB) primary color paradigm has yet to be realized for many reasons, one of which is the unavailability of suitable green and blue materials having sufficient Faraday rotation values and suitable transmissivity of the desired green and blue wavelengths.

What is needed are magneto-optic materials suitable for use in the green and blue spectrum.

BRIEF SUMMARY OF THE INVENTION

Disclosed is an apparatus, method, system, and computer-program product for producing magneto-optic materials in the blue and green wavelengths. The apparatus includes a substrate generally transparent to a light signal including a component at a predetermined visible frequency; a stack of optical multilayers overlying the substrate for transmitting the component with at least about forty percent power therethrough and having at least about twenty-four degrees of Faraday rotation per micron for the predetermined visible frequency less than about six hundred nanometers. The method includes processes for the manufacture and assembly of the disclosed materials, with the computer program product including machine-executable instructions for carrying out the disclosed methods.

Magneto-optic materials compatible with magneto-optic displays and projection systems are realized. The disclosed materials enable simple, efficient, and economical multicolored displays employing the red, green, and blue (RGB) primary color paradigm.

BRIEF DESCRIPTION OF THE DRAWINGS

FIG. 1 is a generic representation of a preferred embodiment for a multilayer magneto-optic photonic crystal (MPC) modulating system according to the present invention;

FIG. 2 is a first specific embodiment for an MPC according to the present invention;

FIG. 3 is a second specific embodiment for an MPC according to the present invention;

FIG. 4 is a third specific embodiment for an MPC according to the present invention;

FIG. 5 is preferred embodiment for an alternative layer arrangement in an MPC according to the present invention;

FIG. 6 is a set of graphs of transmission and faraday rotation spectra for the structure of FIG. 2;

FIG. 7 is a set of graphs of transmission and faraday rotation spectra for the structure of FIG. 3; and FIG. 8 is a set of graphs of transmission and faraday rotation spectra for the structure of FIG. 4.

DETAILED DESCRIPTION OF THE INVENTION

The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

FIG. 1 is a generic representation of a preferred embodiment for a multilayer magneto-optic photonic crystal (MPC) modulating system 100 according to the present invention. MPC modulating system 100 is typically a planar structure having an input side for receiving polarized (e.g., one of right-hand circularly polarized or left-hand circularly polarized light) radiation 105, an MPC structure 110, and an output side for transmitting the polarized light with a different magnitude of polarization rotation 115 effected by a magnetic field (B) imposed on the radiation parallel to the propagation direction of the radiation (e.g., Faraday Effect).

MPC 110 includes a substrate 120 supporting N number of layers ($120_i$, i=1 to N) of materials of particular thickness and magneto-optic properties having the desired the MPC characteristics as will be described later. By appropriate structuring of layers 120, transmissivity and gyration properties (a measurement of polarization response to the imposed magnetic field B) are achieved for a desired wavelength of input radiation 105.

There are many different ways by which MPC 110 may be manufactured—the preferred embodiment includes the following process steps (though the invention is not intended to be limited to structures made with this process). The process starts with a Gadolinium Gallium Garnet (GGG) or other appropriate supporting substrate (e.g., silicon and the like) depending upon the wavelength and desired material properties and composition of layers 120. Size of the substrate depends upon the anticipated use and the number of pixels to be formed in the bulk device—for example 10 mm×10 mm for 128×128 pixel module and approximately 100 mm×50 mm for a 4096×2048 pixel module in the preferred embodiment for an MPC to be used in a projector system having each pixel surrounded by a magnetic field generating conductive array. These dimensions of course may be adapted and altered for any particular use.

A preferred manufacturing process includes sputtering multilayers of magnetic and non-magnetic materials of different thicknesses dependent on structure and wavelength as illustrated in FIG. 2, FIG. 3, and FIG. 4 for example. While radiofrequency sputtering is preferred to produce layers 120, other layering techniques are well-known and may be used instead or in conjunction, depending upon the needs and desires of the specific implementation. As will be explained further below, the preferred embodiment provides each layer 120× with a thickness dependent upon the wavelength of the transmitted light. It is also understood that the following representative preferred structures are designed for a blue wavelength to improve transmissivity and gyration at these wavelength. In the following discussion, we use the following wavelengths to correspond to blue, green, and red: for a blue module, $\lambda=473$ nm, for a green module, $\lambda=532$ nm, and for a red module, $\lambda=632$ nm.

Sputtering is a physical process whereby atoms in a solid target material are ejected into the gas phase due to bombardment of the material by energetic ions. It is commonly used for thin-film deposition, as well as analytical techniques. Sputtering is largely driven by momentum exchange between the ions and atoms in the material, due to collisions. The process can be thought of as atomic billiards, with the ion (cue ball) striking a large cluster of close-packed atoms (billiard balls). Although the first collision pushes atoms deeper into the cluster, subsequent collisions between the atoms result in some of the atoms near the surface being ejected away from the cluster. The number of atoms ejected from the surface per incident ion is called the sputter yield and is an important measure of the efficiency of the sputtering process. Other things the sputter yield depends on are the energy of the incident ions, the masses of the ions and target atoms, and the binding energy of atoms in the solid. The ions for the sputtering process are supplied by a plasma that is induced in the sputtering equipment. In practice a variety of techniques are used to modify the plasma properties, especially ion density, to achieve the optimum sputtering conditions, including usage of RF (radio frequency) alternating current, utilization of magnetic fields, and application of a bias voltage to the target.

Sputtered atoms ejected into the gas phase are not in their thermodynamic equilibrium state. Deposition of the sputtered material tends to occur on all surfaces inside the vacuum chamber. Sputtering is used extensively in the semiconductor industry to deposit thin films of various materials in integrated circuit processing. Thin antireflection coatings on glass for optical applications are also deposited by sputtering.

Because of the low substrate temperatures used, sputtering is an ideal method for depositing contact metals for thin-film transistors. Perhaps the most familiar products of sputtering are low-emissivity coatings on glass, used in double-pane window assemblies. The coating is a multilayer containing silver and metal oxides such as zinc oxide, tin oxide, or titanium dioxide.

One important advantage of sputtering as a deposition technique is that the deposited films have the same composition as the source material. The equality of the film and target stoichiometry might be surprising since the sputter yield depends on the atomic weight of the atoms in the target. One might therefore expect one component of an alloy or mixture to sputter faster than the other components, leading to an enrichment of that component in the deposit. However, since only surface atoms can be sputtered, the faster ejection of one element leaves the surface enriched with the others, effectively counteracting the difference in sputter rates. In contrast with thermal evaporation techniques one component of the source may have a higher vapor pressure, resulting in a deposited film with a different composition than the source.

Sputter deposition also has an advantage over molecular beam epitaxy (MBE) due to its speed. The higher rate of deposition results in lower impurity incorporation because fewer impurities are able to reach the surface of the substrate in the same amount of time. Sputtering methods are consequently able to use process gases with far higher impurity concentrations than the vacuum pressure that MBE methods can tolerate. During sputter deposition the substrate may be bombarded by energetic ions and neutral atoms. Ions can be deflected with a substrate bias and neutral bombardment can be minimized by off-axis sputtering, but only at a cost in deposition rate. Plastic substrates cannot tolerate the bombardment and are usually coated via evaporation.

Sputter guns are usually magnetrons that depend on strong electric and magnetic fields. The sputter gas is inert, typically argon. The sputtering process can be disrupted by other electric or magnetic fields in the vicinity of the target. Charge build-up on insulating targets can be avoided with the use of RF sputtering where the sign of the anode-cathode bias is varied at a high rate. RF sputtering works well to produce highly insulating oxide films but only with the added expense of RF power supplies and impedance matching networks. Stray magnetic fields leaking from ferromagnetic targets also disturb the sputtering process. Specially designed sputter guns with unusually strong permanent magnets must often be used in compensation.

Ion-beam sputtering (IBS) is a method in which the target is external to the ion source. In a Kaufman source ions are generated by collisions with electrons that are confined by a magnetic field as in a magnetron. They are then accelerated by the electric field emanating from a grid toward a target. As the ions leave the source they are neutralized by electrons from a second external filament. IBS has an advantage in that the energy and flux of ions can be controlled independently. Since the flux that strikes the target is composed of neutral atoms, either insulating or conducting targets can be sputtered. IBS has found application in the manufacture of thin-film heads for disk drives. The principal drawback of IBS is the large amount of maintenance required to keep the ion source operating.

Reactive sputtering refers to a technique where the deposited film is formed by chemical reaction between the target material and a gas which is introduced into the vacuum chamber. Oxide and nitride films are often fabricated using reactive sputtering. The composition of the film can be controlled by varying the relative pressures of the inert and reactive gases.

Film stoichiometry is an important parameter for optimizing functional properties like the stress in SiNx and the index of refraction of $SiO_x$. The transparent indium tin oxide conductor that is used in optoelectronics and solar cells is made by reactive sputtering.

In ion-assisted deposition (IAD) the substrate is exposed to a secondary ion beam operating at a lower power than the sputter gun. Usually a Kaufman source like that used in IBS supplies the secondary beam. IAD can be used to deposit carbon in diamond-like form on a substrate. Any carbon atoms landing on the substrate which fail to bond properly in the diamond crystal lattice will be knocked off by the secondary beam. NASA used this technique to experiment with depositing diamond films on turbine blades in the 1980's. IAS is used in other important industrial applications such as creating tetrahedral amorphous carbon surface coatings on hard disk platters and hard transition metal nitride coatings on medical implants.

In the preferred embodiment, sputtering targets can be commercially available or custom made, and designed for the number and type/composition of the layers 120. In structures shown in FIG. 2 through FIG. 4, the maximum number of required sputtering targets is 3. However, in other embodiments and implementations, it may be more than this number, e.g. 6-8 (or more or less), will be used to achieve alternative preferred structures.

FIG. 2 is a first specific preferred embodiment for an MPC 200 according to the present invention. FIG. 6 is a set of graphs of transmission and faraday rotation spectra for the structure of FIG. 2. MPC 200 includes a substrate of GGG and layers of two materials designated "M" and "L" where M is bismuth substituted yttrium iron-garnet (Bi:YIG) and L is the same as the substrate—namely GGG. The design wavelength for MPC 200 is 473 nm and each layer has a thickness approximately equal to $\lambda/4$ n, where n is the index for the specific layer material (e.g., n(L) is about 1.97 and n(M) is about 2.8. Thus a thickness of each of the L layers is about 60.02 nm and a thickness of each of the M layers is about 42.23 nm for a total thickness of all layers of about 662.4 nm. For simplicity, the arrangement of the layers of MPC 200 is described according to the sequence: S(ML)2(M)6(LM)2 signifying that there are a total of 4 L layers and 10 M layers on top of the substrate, arranged as shown in FIG. 2. Note that in some deposition or layering systems, the (M)6 section of MPC 200 may either be 6 independent layers of M, one layer of M 6*42.23 nm thick, or some combination of layers producing the same or similar result. MPC 200, structured as shown, produces a gyration of 0.04-0.2i (providing an intrinsic rotation of about 24 degrees/micron). Absorption—$\alpha(M)$ is about 7000 $cm^{-1}$ and $\alpha(L)$ is about 100 $cm^{-1}$—and the standard deviation for the thickness for all layers is about 0.5 nm (~1%).

FIG. 3 is a second specific preferred embodiment for an MPC 300 according to the present invention. FIG. 7 is a set of graphs of transmission and faraday rotation spectra for the structure of FIG. 3. MPC 300 includes a substrate of $SiO_2$ (or in some cases GGG) and layers of three materials designated "M" and "L" and "H" where M is $Bi_3Fe_5O_{12}$ (alternatively Ce-doped) with good specific Faraday rotation and L is GGG and H is ZnO and/or $Ta_2O_5$. The design wavelength for MPC 300 is also 473 nm and each layer has a thickness approximately equal to $\lambda/4$ n, where n is the index for the specific layer material (e.g., n(substrate)=2.1, n(L) is about 1.9, n(M) is about 2.8, and n(H) is about 2.0. Thus a thickness of each of the L layers is about 62.23 nm, a thickness of each of the M layers is about 42.23 nm, and a thickness of each of the H layers is about 59.12 nm for a total thickness of all layers of about 2300 nm. For simplicity, the arrangement of the layers of MPC 300 is described according to the sequence: S(H)1(M)13(HL)10(M)6(LH)2 signifying that there are a total of 12 L layers, 19 M layers and 13H layers on top of the substrate, arranged as shown in FIG. 3. Note that in FIG. 3, for convenience that a schema for identifying the layers is used as 10@HL meaning that there are 10 sequences of the H and L alternating layers in that portion of MPC 300. Absorption—$\alpha(M)$ is about 7000 $cm^{-1}$ and $\alpha(L)$ is about 100 $cm^{-1}$.

FIG. 4 is a third specific preferred embodiment for an MPC 400 according to the present invention. FIG. 8 is a set of graphs of transmission and faraday rotation spectra for the structure of FIG. 4. MPC 400 includes a substrate of $SiO_2$ (or in some cases GGG) and layers of two materials designated "M" and "L" where M is paramagnetic CdMnTe and L is $SiO_2$. The design wavelength for MPC 400 is also 473 nm and each layer has a thickness approximately equal to $\lambda/4$ n, where n is the index for the specific layer material (e.g., n(substrate)=n(L) is about 1.5, n(M) is taken to be about 2.5 for a total thickness of about 5.3 microns. For simplicity, the arrangement of the layers of MPC 400 is described according to the sequence: S(LM)8(ML)15(LM)13(ML)6 signifying that there are a total of 39 L and M layers, arranged as shown in FIG. 4. Note that in FIG. 4, for convenience that a schema for identifying the layers is used as 8@LM meaning that there are 8 sequences of the L and M alternating layers in that portion of MPC 400. Absorption—$\alpha(M)$ is about 20 $cm^{-1}$ and $\alpha(L)$ is about 0 $cm^{-1}$.

FIG. 5 is preferred embodiment for an alternative layer arrangement in an MPC according to the present invention. Some reported measurements have shown that thin (10-30 nm) cobalt (Co) films have lower loss coefficient in comparison to thicker films. This phenomenon is attributed to a tunneling effect (wave will tunnel through the film and appear outside) and some implementations are believed to be suitable for multi-pass in an MPC. Co has Faraday rotation about 50 times greater than Bi:YIG (saturated intrinsic rotation is 36.3 deg/micron at H=1.78 Tesla). An MPC consisting of layers of Co (10-20 nm) and dielectric layers may be an efficient approach for both high Faraday rotation and adequate transmission, especially considering that rotation of Co is stronger at shorter wavelengths (blue).

In order to include such a material in an MPC, it may be necessary or desirable to supplement any given sublayer, such as the use of a magnetooptic material film or an inert/transparent film or the like, to produce a layer having a total overall thickness of $\lambda/4$ n.

In FIG. 5, a layer 500 of an MPC is shown including an enhanced property layer 505 and a thickness-adjusting layer 510 (while other configurations having more than 2 layers is also possible wherein different attributes for transmissivity and gyration are provided by multiple sublayers to produce a single layer, such as for example use in an MPC shown in FIG. 1 through FIG. 4. In one case, sublayer 505 is a cobalt thin film and sublayer 510 includes a GGG or $SiO_2$ layer. In other cases, sublayer 505 may be the paramagnetic material CdMnTe and sublayer 510 may be Bi:YIG. Such a layer 500 of the CdMnTe/Bi:YIG may be used as the M layer in an MPC, such as in MPC 400 shown in FIG. 4.

To build magneto-optic BLUE (hereinafter MO-B) and GREEN (MO-G) modules, a heteroepitaxial all-garnet film processing technology based on Ca-doped $Bi_3Fe_5O_{12}$ (hereinafter Ca:BIG), Ce-doped $Y_3Fe_5O_{12}$ (Ce:YIG), and Ga-doped $Bi_3Fe_5O_{12}$ (Ga:BIG) garnet materials has been developed. Ca- and Ga-doping enable the enhancement of optical transparency whereas the Ce-doping results in a strong blue-shift of the absorption edge and Faraday rotation (FR). Fabricating and optimizing MO-photonic crystals has included use of a "combinatorial" approach combining various garnet compositions, various material sequences and number of layers both in the central optical cavity as well as in dielectrical mirrors. The main representatives of the photonic crystals possessing good MO-performance are presented in Table I below.

TABLE I

|  |  | λ/2 Optical Cavity | | | |
| --- | --- | --- | --- | --- | --- |
|  |  | Ca:BIG | Ca:BIG/GGG | Ga:BIG | Ce:BIG |
| Mirrors | Ca:BIG/GGG | MO-G1 | MO-G3 |  |  |
|  | Ga:BIG/GGG |  |  | MO-G4, MO-G6 |  |
|  | Ce:YIG/GGG |  |  | MO-G5 | MO-B1, MO-B2, MO-B3 |
|  | YIG/GGG |  |  | MO-G2 |  |

The names of the photonic crystals MO-Bi or MO-Gi notify BLUE or GREEN light operational range while i is the sample number. All the photonic crystals, except MO-G3 and MO-G6, have the homogeneous central optical cavity with the thickness λ/2n and dielectric λ/4 n mirrors where the n is the refraction index of the corresponding garnet material. The optical cavity in MO-G3 crystal has been fabricated as a sequence of five Ca:BIG and GGG layers which thicknesses satisfy the following condition:

$$d_{Ca:BIG} \times n_{Ca:BG}(\lambda) + d_{GGG} \times N_{GGG}(\lambda) = \lambda/2,$$

where λ is the designed wavelength. Also, the Ca:BIG/GGG/Ca:BIG/GGG/Ca:BIG five layer sequence has been fabricated using the following number of laser pulses 100/656/1000/656/100, respectively. To make mirrors more transparent in MO-G6 crystal, they have been built using the stack of λ/8nGa:BIG thick Ga:BIG and 3λ/8nGGG thick GGG garnets.

It is seen from FIG. 6 through FIG. 8 that significant enhancement of the Faraday rotation has been achieved in magneto-optic photonic crystals. The fabricated crystals have a limited number of the dielectric mirrors, however a strong rejection of the light within the band gap has been demonstrated both for MO-G and MO-B modules. A distinctive feature of the MO-B modules is the positive Faraday rotation utilized in Ce:YIG material. The structures demonstrate the feasibility to use Ce:YIG garnet as well as Ca:BIG and Ga:BIG garnets for MO-B and MO-G modules, respectively.

Note that in some instances, various results for transmission and gyration/rotation are described. In most cases, the results are based upon measured results taken from structures produced using pulsed laser deposition. It is understood that some of the other manufacturing techniques, including RF Magnetron Sputtering and molecular beam epitaxy (MBE) generally produce improved results due to the quality of the manufactured layers. For example, in some cases, RF magnetron sputtering results in at least half absorption coefficients in comparison to Pulsed Laser Deposition (PLD). Liquid Phase Epitaxy (LPE) results in around half absorption coefficients with respect to RF sputtering.

For example, using PLD to synthesize an optimized RED MPC structure S(ML)1(MM)10(LM)3(MM)11(ML)6(LM)4, the M layers (BIG) would have an absorption coefficient (for example) $A = 2800 \, cm^{-1}$ and gyration −0.035, resulting in a transmission of 21.9% and Faraday rotation of 18.7 degrees (that is a dynamic range of 8.1%=transmittance*sin(2*rotation)^2). When RF magnetron sputtering is used, the absorption coefficient of the M layers becomes at most $A = 1400 \, cm^{-1}$ and the gyration stays the same (−0.035), resulting in an optimized structure S(ML)2(MM)8(LM)5(MM)9(ML)8(LM)5 of transmission of 29.6% and Faraday rotation of 29.5 degrees (that is a dynamic range of 21.7%).

Table II and Table III below include comparisons between PLD and sputtered RGB MPC structures. For PLD MPCs, measured absorption coefficients and Faraday rotations were used. For sputterd MPCs, absorption coefficients were selected are as shown. Note that LPE is currently practical only for planar structures. In Table III, the columns include wavelength, transmittance, rotation, dynamic range, thickness, MPC structure, absorption, and deposition type (i.e., pulsed laser deposition, RF sputtering, and liquid phase epitaxy). In Table III, rows having transmittance prefaced with a "*" are measured results, the others are results from a simulation. The type of structure used to obtain the values corresponds generally to FIG. 2 of the incorporated 60/766,764 patent application. Gyration values for the entries in Table III include g=0.035 for a BIG/GGG structure used with red; g=0.05 for a BIG/GGG structure used with green, g=0.01 for a Ce-YIG/BBB structure used with blue, and g=0.27 for a BIG/air structure used with planar structures as shown (PS=planar structures).

TABLE II

| Wavelength (nm) | Transmittance | Rotation (deg) | Dynamic Range = Transmittance* Sin(2 * Rotation)^2 |
| --- | --- | --- | --- |
| RED @ 673 | 45% | 5.1 | 1.42 |
| @ 657 | 41% | 5.7 | 1.60 |
| @ 676 | 46% | 5.2 | 1.50 |
| @ 678 | 47% | 5.1 | 1.47 |
| @ 738 | 39% | 7.5 | 2.61 |
| @ 770 | 43% | 6.6 | 2.24 |
| @ 825 | 46% | 4.4 | 1.08 |
| GREEN @ 594 | 41% | 5.6 | 1.55 |
| @ 571 | 31% | 6.7 | 1.66 |
| @ 588 | 41% | 5.8 | 1.66 |
| @ 581 | 36% | 5.8 | 1.45 |
| BLUE @ 467 | 33% | 1.9 | 0.14 |
| @ 473 | 35% | 1.9 | 0.15 |
| @ 475 | 35% | 2 | 0.17 |
| @ 475 | 22% | 2.4 | 0.15 |

TABLE III

| λ (nm) | T % | Rot. | Range % | d (um) | MPC strcuture | A (cm^−1) | Depo |
| --- | --- | --- | --- | --- | --- | --- | --- |
| 738 | *40 | 7.5 | 2.68 | 1.43 | S(ML)4(M)2(LM)4 | 2800 | PLD |
| 738 | 21 | 16.2 | 5.94 | 4.6 | S(MM)11(ML)4(LM)9(ML)6 | 2800 | PLD |
| 635 | 30.3 | 14.8 | 7.39 | 3.14 | S(ML)1(MM)10(LM)4(MM)6(ML)4 | 2800 | PLD |
| 635 | 21.9 | 18.7 | 8.07 | 4.42 | S(ML)1(MM)10(LM)3(MM)11(ML)6(LM)4 | 2800 | PLD |
| 635 | 29.6 | 29.5 | 21.73 | 4.2 | S(ML)1(MM)9(LM)3(MM)7(ML)6(LM)3 | 1400 | RFS |
| 540 | *20.0 | 6 | 0.86 | 0.8 | S(ML)3(MM)1(LM)3 | 17000 | PLD |

TABLE III-continued

| λ (nm) | T % | Rot. | Range % | d (um) | MPC strcuture | A (cm^-1) | Depo |
|---|---|---|---|---|---|---|---|
| 540 | 22.8 | 17.1 | 7.20 | 2.96 | S(LM)4(ML)8(LM)8(ML)5 | 5000 | RFS |
| 540 | 20.4 | 18.5 | 7.38 | 3 | S(ML)3(LM)5(MM)10(ML)6(LM)3 | 5000 | RFS |
| 470 | *28.0 | 2.1 | 0.15 | 0.89 | S(ML)4(MM)1(LM)4 | 5500 | PLD |
| 470 | 16.1 | 4.3 | 0.36 | 2.57 | S(ML)1(MM)10(LM)5(ML)8(LM)3 | 5500 | PLD |
| 470 PS | 18.5 | 10.3 | 2.29 | 3.07 | S(MM)10(LM)6(ML)9(MM)6(LM)2 | 2000 | RFS |
| 470 | 49 | 36.1 | 44.13 | 1.4 | S(MM)11(LL)12(MM)82(LL)12(MM)11 Thicknesses of L and M = λ/4 | 7000 | LPE |

The system, method, computer program product, and propagated signal described in this application may, of course, be embodied in hardware; e.g., within or coupled to a Central Processing Unit ("CPU"), microprocessor, microcontroller, System on Chip ("SOC"), or any other programmable device. Additionally, the system, method, computer program product, and propagated signal may be embodied in software (e.g., computer readable code, program code, instructions and/or data disposed in any form, such as source, object or machine language) disposed, for example, in a computer usable (e.g., readable) medium configured to store the software. Such software enables the function, fabrication, modeling, simulation, description and/or testing of the apparatus and processes described herein. For example, this can be accomplished through the use of general programming languages (e.g., C, C++), GDSII databases, hardware description languages (HDL) including Verilog HDL, VHDL, AHDL (Altera HDL) and so on, or other available programs, databases, nanoprocessing, and/or circuit (i.e., schematic) capture tools. Such software can be disposed in any known computer usable medium including semiconductor, magnetic disk, optical disc (e.g., CD-ROM, DVD-ROM, etc.) and as a computer data signal embodied in a computer usable (e.g., readable) transmission medium (e.g., carrier wave or any other medium including digital, optical, or analog-based medium). As such, the software can be transmitted over communication networks including the Internet and intranets. A system, method, computer program product, and propagated signal embodied in software may be included in a semiconductor intellectual property core (e.g., embodied in HDL) and transformed to hardware in the production of integrated circuits. Additionally, a system, method, computer program product, and propagated signal as described herein may be embodied as a combination of hardware and software.

One of the preferred implementations of the present invention is as a routine in an operating system made up of programming steps or instructions resident in a memory of a computing system, during computer operations. Until required by the computer system, the program instructions may be stored in another readable medium, e.g. in a disk drive, or in a removable memory, such as an optical disk for use in a CD ROM computer input or in a floppy disk for use in a floppy disk drive computer input. Further, the program instructions may be stored in the memory of another computer prior to use in the system of the present invention and transmitted over a LAN or a WAN, such as the Internet, when required by the user of the present invention. One skilled in the art should appreciate that the processes controlling the present invention are capable of being distributed in the form of computer readable media in a variety of forms.

Any suitable programming language can be used to implement the routines of the present invention including C, C++, Java, assembly language, etc. Different programming techniques can be employed such as procedural or object oriented.

The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. An apparatus, comprising:
   a substrate generally transparent to a light signal including a component at a predetermined visible frequency;
   a stack of optical multilayers overlying said substrate for transmitting said component with at least about forty percent power therethrough and having at least about twenty-four degrees of Faraday rotation per micron for said predetermined visible frequency less than about six hundred nanometers.

2. The apparatus of claim 1 wherein said predetermined visible frequency is about four hundred seventy three nanometers plus and minus about ten nanometers.

3. The apparatus of claim 1 wherein said predetermined visible frequency is about five hundred thirty two nanometers plus and minus about ten nanometers.

4. The apparatus of claim 1 wherein said stack of optical multilayers comprises a layer sequence denominated by (ML)2(M)6(LM)2 wherein M is a magneto-optic material and wherein L is a non-magneto-optic material.

5. The apparatus of claim 4 wherein said substrate and said L layers include substantially $Gd_3Ga_5O_{12}$ (GGG).

6. The apparatus of claim 5 wherein said M layers include Bismuth substituted Yttrium Iron Garnet (Bi:YIG).

7. The apparatus of claim 1 wherein said stack of optical multilayers comprises a layer sequence denominated by (H)1(M)13(HL)10(M)6(LH)2 wherein M is a magneto-optic material and wherein L is a non-magneto-optic material.

8. The apparatus of claim 7 wherein said substrate and said L layers are selected from at least one member of the group consisting essentially of $Gd_3Ga_5O_{12}$ (GGG), $SiO_2$, and combinations thereof.

9. The apparatus of claim 8 wherein said H layers are selected from at least one member of the group consisting essentially of one or more of $ZnO$, $Ta_2O_5$, and combinations thereof.

10. The apparatus of claim 9 wherein said M layers are selected from at least one member of the group consisting essentially of $Bi_3Fe_5O_{12}$, Bi:YIG, and combinations thereof.

11. The apparatus of claim 8 wherein said M layers are selected from at least one member of the group consisting essentially of $Bi_3Fe_5O_{12}$, Bi:YIG, and combinations thereof.

12. The apparatus of claim 1 wherein said stack of optical multilayers comprises a layer sequence denominated by (LM)8(ML)15(LM)13(ML)6 wherein M is a magneto-optic paramagnetic material and wherein L is a non-magneto-optic material.

13. The apparatus of claim 12 wherein said substrate and said L layers include substantially $Gd_3Ga_5O_{12}$ (GGG).

14. The apparatus of claim 12 wherein said M layers include substantially CdMnTe.

15. The apparatus of claim 1 wherein each said optical multilayer of said stack has a thickness about equal to a wavelength of said predetermined visible frequency in free space divided by four times an index of refraction of a material of said optical multilayer.

16. The apparatus of claim 15 wherein at least one of said optical multilayers includes a magneto-optic material layer having at least two sub-layers including a first property enhancing sub-layer and a second thickness adjusting sub-layer wherein a total thickness of said at least one optical multilayer is about equal to said thickness.

17. The apparatus of claim 16 wherein said first property enhancing sub-layer includes at least one member material selected from the group consisting of substantially CdMnTe, cobalt, or combinations thereof.

18. The apparatus of claim 17 wherein said second property enhancing sub-layer includes at least one member material selected from the group consisting of substantially Bi:YIG, SiO$_2$, or combinations thereof.

19. The apparatus of claim 16 wherein said second property enhancing sub-layer includes at least one member material selected from the group consisting of substantially Bi:YIG, SiO$_2$, or combinations thereof.

20. A method, the method comprising:
   a) preparing a surface of a substrate for multilayer formation; and
   b) forming a plurality of layers of visible wavelength transmissive over said substrate to produce an assembly having at least about twenty percent transmission of wavelength at less than about six hundred nanometers and an intrinsic rotation of at least about twenty four degrees per micron.

21. A computer program product comprising a computer readable medium carrying program instructions for forming an MPC thin film stack structure when executed using a computing system, the executed program instructions executing a method, the method comprising:
   a) preparing a surface of a substrate for multilayer formation; and
   b) forming a plurality of layers of visible wavelength transmissive over said substrate to produce an assembly having at least about twenty percent transmission of wavelength at less than about six hundred nanometers and an intrinsic rotation of at least about twenty four degrees per micron.

* * * * *